United States Patent
Sakata et al.

(10) Patent No.: US 7,771,186 B2
(45) Date of Patent: Aug. 10, 2010

(54) FLEXIBLE TUBE AGING APPARATUS AND METHOD

(75) Inventors: Hiroshi Sakata, Minami-ashigara (JP); Fumio Noji, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 2 days.

(21) Appl. No.: 12/365,674

(22) Filed: Feb. 4, 2009

(65) Prior Publication Data

US 2009/0200708 A1 Aug. 13, 2009

(30) Foreign Application Priority Data

Feb. 13, 2008 (JP) .............................. 2008-031303

(51) Int. Cl.
*B27N 7/00* (2006.01)
(52) U.S. Cl. ........................ 425/392; 425/367; 425/446; 264/340
(58) Field of Classification Search ................ D24/138; 427/2.12; 600/101, 121; 264/340, 232; 425/367, 425/446, 135, 392, 393; 72/389.1
See application file for complete search history.

(56) References Cited

U.S. PATENT DOCUMENTS

| 677,142 | A | * | 6/1901 | Richardson | 72/175 |
| 7,162,903 | B2 | * | 1/2007 | Juranitch et al. | 72/110 |
| 2002/0017515 | A1 | * | 2/2002 | Obata et al. | 219/137 R |

FOREIGN PATENT DOCUMENTS

JP 2006-000281 A 1/2006

* cited by examiner

*Primary Examiner*—Joseph S Del Sole
*Assistant Examiner*—David N Brown, II
(74) *Attorney, Agent, or Firm*—Sughrue Mion, PLLC (57) ABSTRACT

An aging apparatus has a roller group consisting of a front roller, a middle roller and a rear roller, and a table for supporting the roller group. The middle roller takes a press state pressing a flexible tube with a constant force and a retraction state staying away from the flexible tube. In aging operation, while the middle roller comes in the press state, the table moves from a start position being a farthest end of the flexible tube to an end position. After the aging operation, the middle roller comes in the retraction state and the table returns to the start position. The aging operation is performed a predetermined number of times on the same flexible tube, so that the flexible tube is bent more largely with increase in the number of execution.

7 Claims, 7 Drawing Sheets

FLEXIBLE TUBE AGING APPARATUS AND METHOD

BACKGROUND OF THE INVENTION

1. Field of the Invention

The present invention relates to an aging apparatus and aging method for performing aging processing on a flexible tube of an endoscope.

2. Description Related to the Prior Art

A flexible endoscope (hereinafter simply referred to as endoscope) is commonly known which has a flexible slender insertion section inserted into a patient's body, piping, and the like. The insertion section of the endoscope consists of a slender flexible tube, a bending section provided at an end of the flexible tube, and a rigid tip section provided at the tip of the bending section. The flexible tube constitutes the most part of the insertion section. The flexible tube is composed of a helical tube made up of a helically wound metal strip, a tubular net for covering the helical tube, and a resin jacket for further covering the outer periphery of the tubular net. Intending the insertion section to be inserted into a complex path, the flexible tube requires excellent flexibility.

In manufacturing the flexible tube, the tubular net first covers the helical tube to form an internal construction. An adhesive is applied to the whole surface of the internal construction. After evaporating a solvent of the adhesive, the internal construction is covered with molten resin to form a jacket. However, the adhesive sometimes seeps into meshes of the tubular net in applying the adhesive, and the adhesive sticking to undesirable portions of the helical tube prevents flexible deformation of the flexible tube. Accordingly, aging process that deforms the manufactured flexible tube into a specified curvature is generally performed for the purpose of removing the adhesive from the undesirable portions.

Japanese Patent Laid-Open Publication No. 2006-000281 discloses an aging apparatus which automatically performs the aging process on a flexible tube. The aging apparatus has a plurality of pulleys over which the flexible tube is looped and a chuck unit for chucking both ends of the flexible tube. Moving the chuck unit carries out the aging process for the whole flexible tube. The locations of the pulleys are partly changeable so that the aging apparatus is available to various kinds of flexible tubes.

In the foregoing aging apparatus, however, the locations of the pulleys are not changed once they have been fixed. In other words, a bending deformation amount (curvature) of the flexible tube is not changed once it has been set. Accordingly, the flexible tube is deformed to a target bending deformation amount from the beginning of the aging process, and undue stress applied to the flexible tube may cause damaging it.

SUMMARY OF THE INVENTION

An object of the present invention is to provide an aging apparatus and method for performing aging process on a flexible tube without damage.

In order to achieve the above object, an aging apparatus for a flexible tube of an endoscope comprises a flexible tube holding mechanism, a roller group, a table, a table drive mechanism, a roller shift mechanism, and a control means. The flexible tube holding mechanism holds both ends of the flexible tube and linearly pulls the flexible tube. The roller group has at least a front roller, a middle roller, and a rear roller. The rollers are arranged in an axial direction of the flexible tube and axes of the rollers are approximately orthogonal to a longitudinal direction of the flexible tube. The front roller and the rear roller as both side rollers are opposed to the middle roller with sandwiching the flexible tube. The table supports the roller group. The table drive mechanism moves the table in the axial direction of the flexible tube. The roller shift mechanism presses one of the middle roller and the both side rollers against the flexible tube so as to bend a part of the flexible tube while the rollers are in parallel with one another. The control means controls the operation of the roller shift mechanism and the table drive mechanism to repeat aging operation, which moves the table in a state of pressing the middle roller or the both side rollers against the flexible tube, so that the flexible tube is bent more largely with increase in the number of the aging operation.

The aging apparatus may further comprise a rotation mechanism for rotating the flexible tube held by the flexible tube holding mechanism about its axis by a predetermined angle whenever the aging operation is repeated a predetermined number of times.

In the aging apparatus, the flexible tube holding mechanism may hold one end of the flexible tube via a constant force spring. The aging operation is carried out in a direction from the other end of the flexible tube to the end with the constant force spring.

In the aging apparatus, the distance between the front roller and the middle roller may be larger than that between the middle roller and the rear roller.

In the aging apparatus, the roller shift mechanism may press the middle roller against the flexible tube with a predetermined press force. Otherwise, the press force may be increased with increase in the number of the aging operation.

In the aging apparatus, the moving speed of the table may be increased with increase in the number of the aging operation.

According to the present invention, an aging method comprises the steps of: pulling both ends of the flexible tube to make the flexible tube linear; catching the flexible tube by at least three rollers including a front roller, a middle roller, and a rear roller; shifting both of the front roller and the rear roller or shifting the middle roller to the flexible tube for pressing and partly banding the flexible tube; carrying out aging operation which moves the three rollers in an axial direction of the flexible tube in a state of partly bending the flexible tube; and repeating the aging operation a predetermined number of times so that the flexible tube is bent more largely with increase in the number of the aging operation.

The aging method may further comprise the step of: rotating the flexible tube by a predetermined angle whenever the aging operation has been completed the predetermined number of times in order to carry out the aging operation across the whole periphery of the flexible tube.

In the aging method, a press force applied to the flexible tube may be constant irrespective of the number of the aging operation, while the aging operation is carried out the predetermined number of times. Otherwise, the press force applied to the flexible tube is increased with increase in the number of the aging operation, while the aging operation is carried out the predetermined number of times.

In the aging method, a moving speed of the three rollers is increased with increase in the number of the aging operation, while the aging operation is carried out the predetermined number of times.

According to the present invention, a bending deformation amount of the flexible tube is increased with repeating the aging operation. Therefore, the aging operation does not cause undue stress and damage to the flexible tube.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

Figure 1:
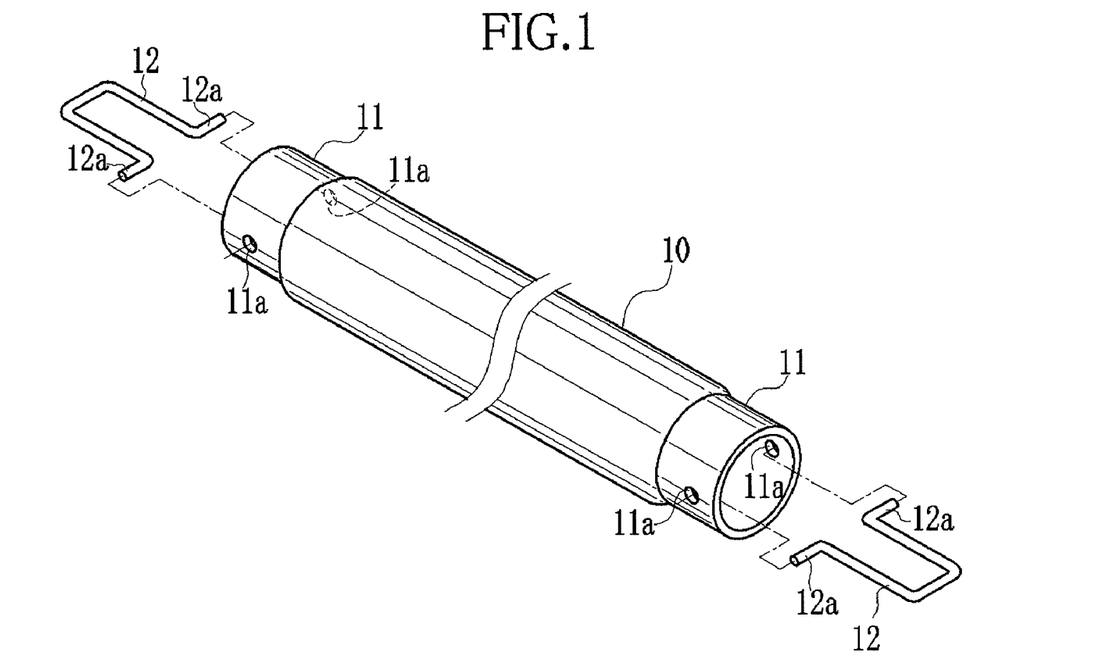
FIG. 1 is an external perspective view of a flexible tube.

Before describing an aging apparatus and method according to the present invention, a flexible tube of an endoscope, which is subjected to aging processing, will be described. The flexible tube constitutes the most part of an insertion section of the endoscope. As shown in FIG. 1, a slender flexible tube 10 is provided with cylindrical end fittings 11 at both ends. In each end fittings 11, a pair of attachment holes 11a is formed oppositely in a radial direction. An approximately channel-shaped connector 12 is attachable to the end fittings 11. The connector 12 has a pair of claws 12a, and the connector 12 is attached to the end fittings 11 by fitting the claw pair 12a into the hole pair 11a.

Figure 2:
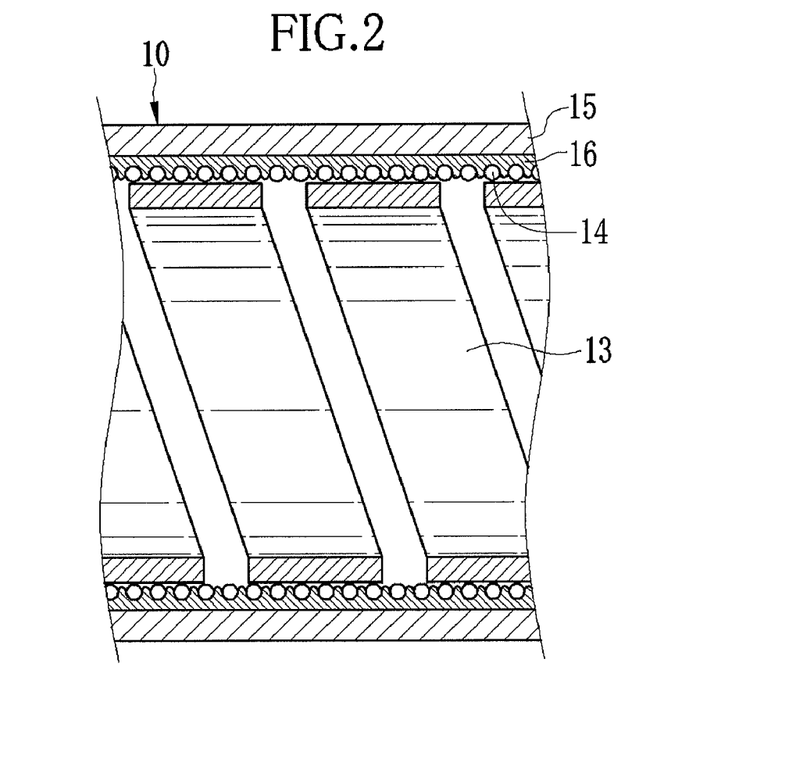
FIG. 2 is a cross-sectional view of the flexible tube taken along its axial direction.

Referring to FIG. 2, the flexible tube 10 is composed of a helical tube 13 made up of a helically wound metal strip, a tubular net 14 for covering the helical tube 13, and a resin jacket 15 covering the outer periphery of the tubular net 14. The tubular net 14 and the jacket 15 tightly adhere to each other via an adhesive 16. Before performing the aging process (treatment), the adhesive 16 gets into meshes of the tubular net 14, and the adhesive 16 sticking to undesirable portions of the helical tube 13 degrades the flexibility of the flexible tube 10.

Next, an aging apparatus 20 will be described. The aging apparatus 20 shown in FIG. 3 can perform the aging process across the whole length and periphery of the flexible tube 10, and handle the three flexible tubes 10 at a time at the maximum.

Figure 3:
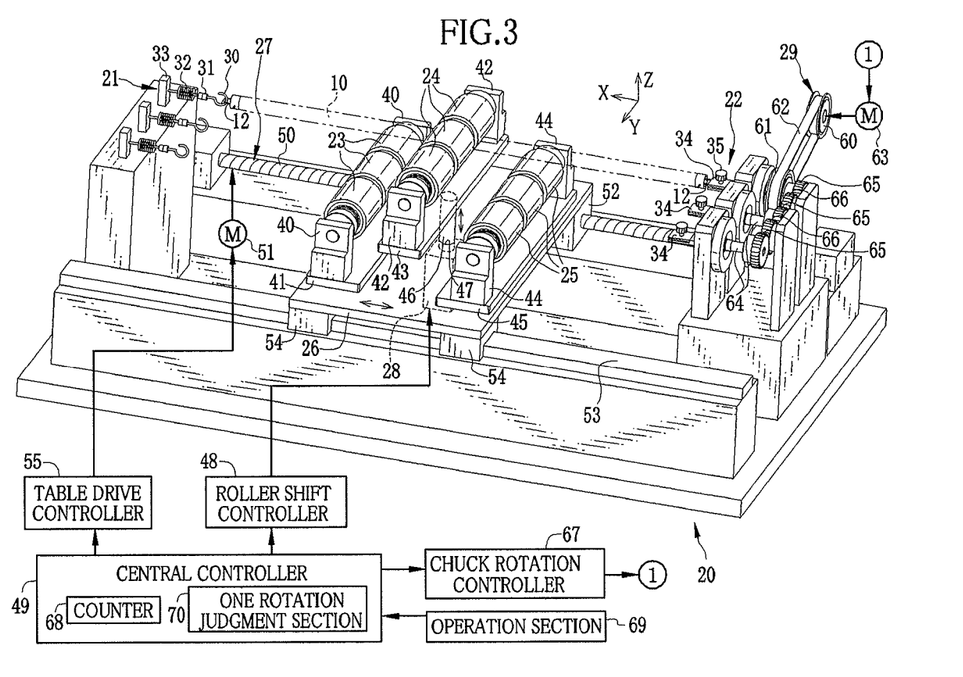
FIG. 3 is an external perspective view of an aging apparatus.

The aging apparatus 20 consists of a flexible tube holding mechanism including left side holding devices 21 and right side holding devices 22, a roller group including front rollers 23, middle rollers 24 and rear rollers 25, a table 26, a table drive mechanism 27, an air cylinder 28 being a roller shift mechanism, and a rotation mechanism 29. The left side holding device 21 and the right side holding device 22 hold both ends of the flexible tube 10 and makes it linear. The rollers 22 to 24 are mounted on the table 26. The table drive mechanism 27 moves the table 26 in an axial direction of the flexible tube 10. The air cylinder 28 moves up and down the middle rollers 24 in order to deform the flexible tube 10 into a bending shape. The rotation mechanism 29 turns the flexible tube 10 around its axis.

The following description uses the X, Y and Z coordinate system to explain directions with defining the axial direction of the held flexible tube 10 as the X direction. However, for the sake of convenience, the X direction may be expressed by words of "back and force" (a left side is defined as a forth direction) and the Z direction may be expressed by words of "up and down".

The left side holding device 21 has a hook 30, a twist return member 31, a constant force spring 32, and an attachment pole 33. The connector 12 at an end of the flexible tube 10 is hooked on the hook 30. The twist return member 31 prevents a twist of the flexible tube 10. The constant force spring 32 attached to the attachment pole 33 pulls the end of the flexible tube 10 with constant force.

The right side holding device 22 has a chuck 34 and a knob 35. The chuck 34 catches the connector 12 on the other end of the flexible tube 10. Rotating the knob 35 operates the chuck 34 to catch and release the connector 12. The left side holding device 21 and the right side holding device 22 are oppositely disposed in the X direction so as to pull both ends of the flexible tube 10 and hold it linear. The flexible tube holding mechanism has three sets of left and right side holding devices 21 and 22 arranged along the Y direction for holding the three flexible tubes 10 at the maximum.

Figure 4:
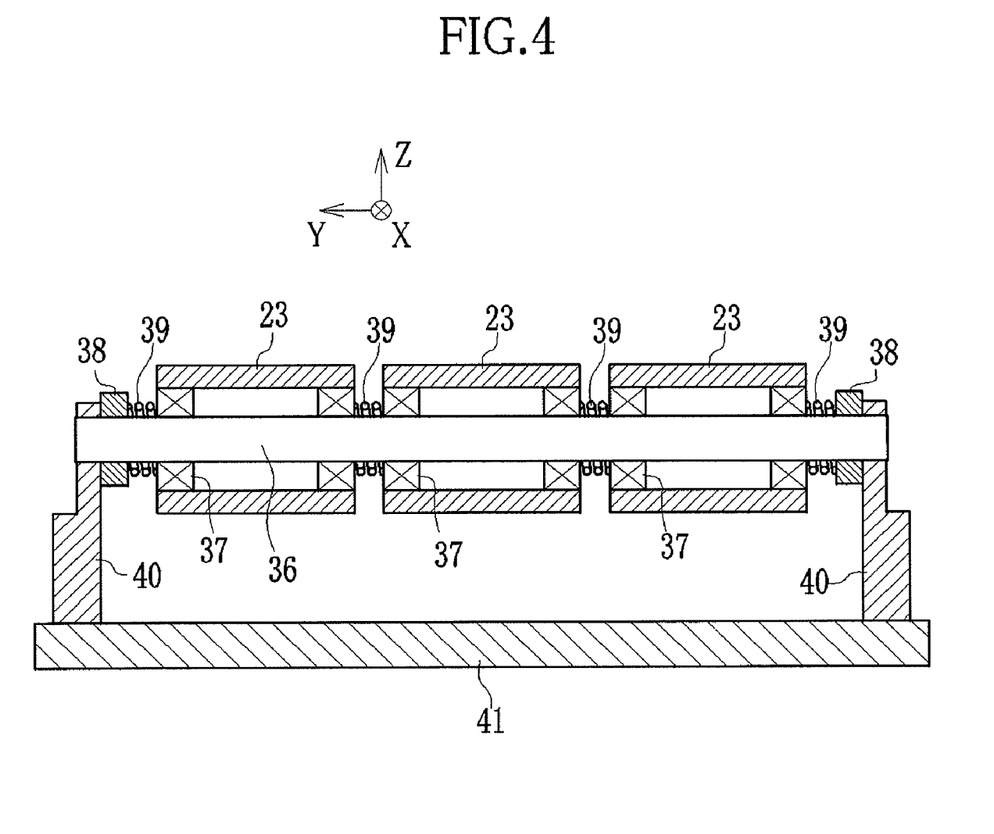
FIG. 4 is a cross-sectional view of a middle roller taken along its axial direction.

The front rollers 23, the middle rollers 24 and the rear rollers 25 are arranged in the X direction. The front rollers 23, as shown in FIG. 4, are attached to a shaft 36 extending in the Y direction via bearings 37 so as to be freely rotatable about the shaft 36. The three front rollers 23 are aligned in the Y direction and spacer rings 38 are provided at both sides of a front roller string. Coil springs 39 are disposed between the spacer ring 38 and the front roller 23 and between the front rollers 23 so that the front rollers 23 are set in predetermined positions movably in the Y direction. Accordingly, when the front roller 23 makes contact with the flexible tube 10, if a Y-directional force is applied to the flexible tube 10, the front roller 23 moves along the Y direction together with the flexible tube 10 and absorbs the force for the purpose of preventing damage to the flexible tube 10. Two support poles 40 hold both ends of the shaft 36, and the two support poles 40 are fixed on a base plate 41. The middle rollers 24 and the rear rollers 25 have the same structure as the front rollers 23.

The middle rollers 24 are supported by two support poles 42 fixed on a base plate 43, and the rear rollers 25 are supported by two support poles 44 fixed on a base plate 45. The base plates 41 and 45 are fixed on the top face of the table 26. The bas plate 43 is movable in the Z direction with respect to the table 26. The front roller 23 and the rear roller 25 are positioned under the linearly held flexible tube 10, and the middle roller 24 is positioned above the flexible tube 10.

The air cylinder 28 is fixed on the bottom face of the table 26. A piston rod 46 of the air cylinder 28 upwardly extends via a through hole 47 formed in the table 26. An upper end of the piston rod 46 is fixed on the bottom face of the base plate 43. Moving up and down the piston rod 46 by the operation of the air cylinder 28 correspondingly moves up and down the middle rollers 24. The middle rollers 24 move while being in parallel with the front rollers 23 and the rear rollers 25.

To the air cylinder 28, an air tank and an air compressor (though neither is illustrated) are connected. Compressed air generated by the air compressor is once retained in the air tank and supplied to the air cylinder 28. The operation of the air cylinder 28 is controlled by a roller shift controller 48. When a central controller 49 inputs a press signal, the roller shift controller 48 drives the air cylinder 28 to bring the middle rollers 24 into a press state where the middle roller 24 presses the flexible tube 10 from above with a constant force. When the central controller 49 inputs a retraction signal, on the other hand, the roller shift controller 48 drives the air cylinder 28 to bring the middle rollers 24 into a retraction state where the middle roller 24 upwardly stays away from the flexible tube 10.

The table drive mechanism 27 has a ball screw 50, a ball screw rotation motor 51, a movable body 52, a guide rail 53, and a slidable body 54. The ball screw rotation motor 51 rotates the ball screw 50 about its axis. The movable body 52 is fed in the X direction in conjunction with the rotation of the ball screw 50. The slidable body 54 slides on the guide rail 53 extending in the X direction. The movable body 52 is fixed on a Y-directional end of the table 26, and the slidable body 54 is fixed on the other Y-directional end thereof. The table 26 is horizontally disposed. A table drive controller 55 controls the operation of the ball screw rotation motor 51.

Figure 5:
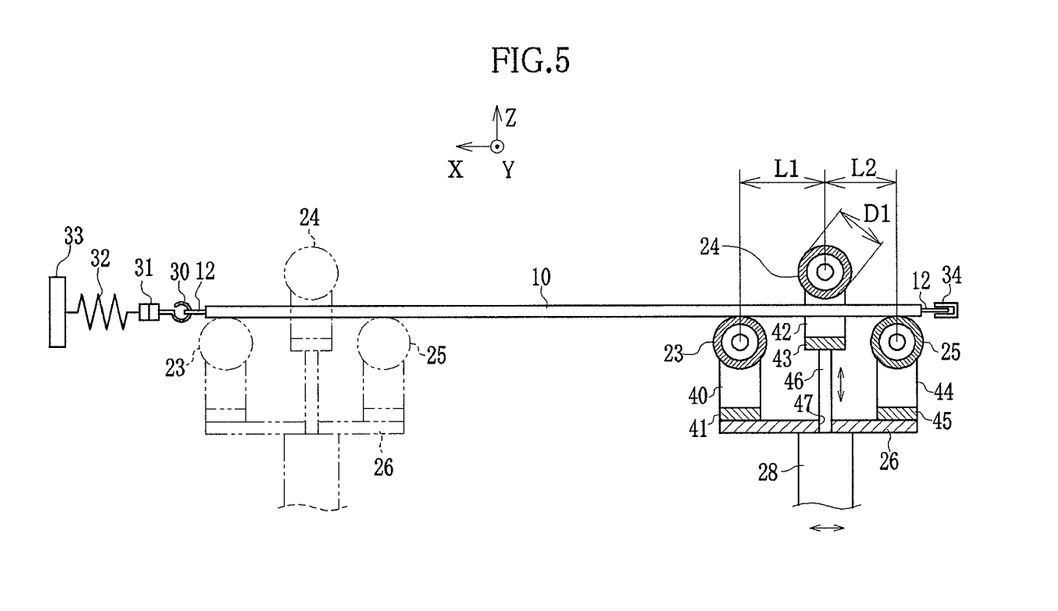
FIG. 5 is an explanatory view showing a principal section of the aging apparatus viewed from a Y direction.
Figure 6:
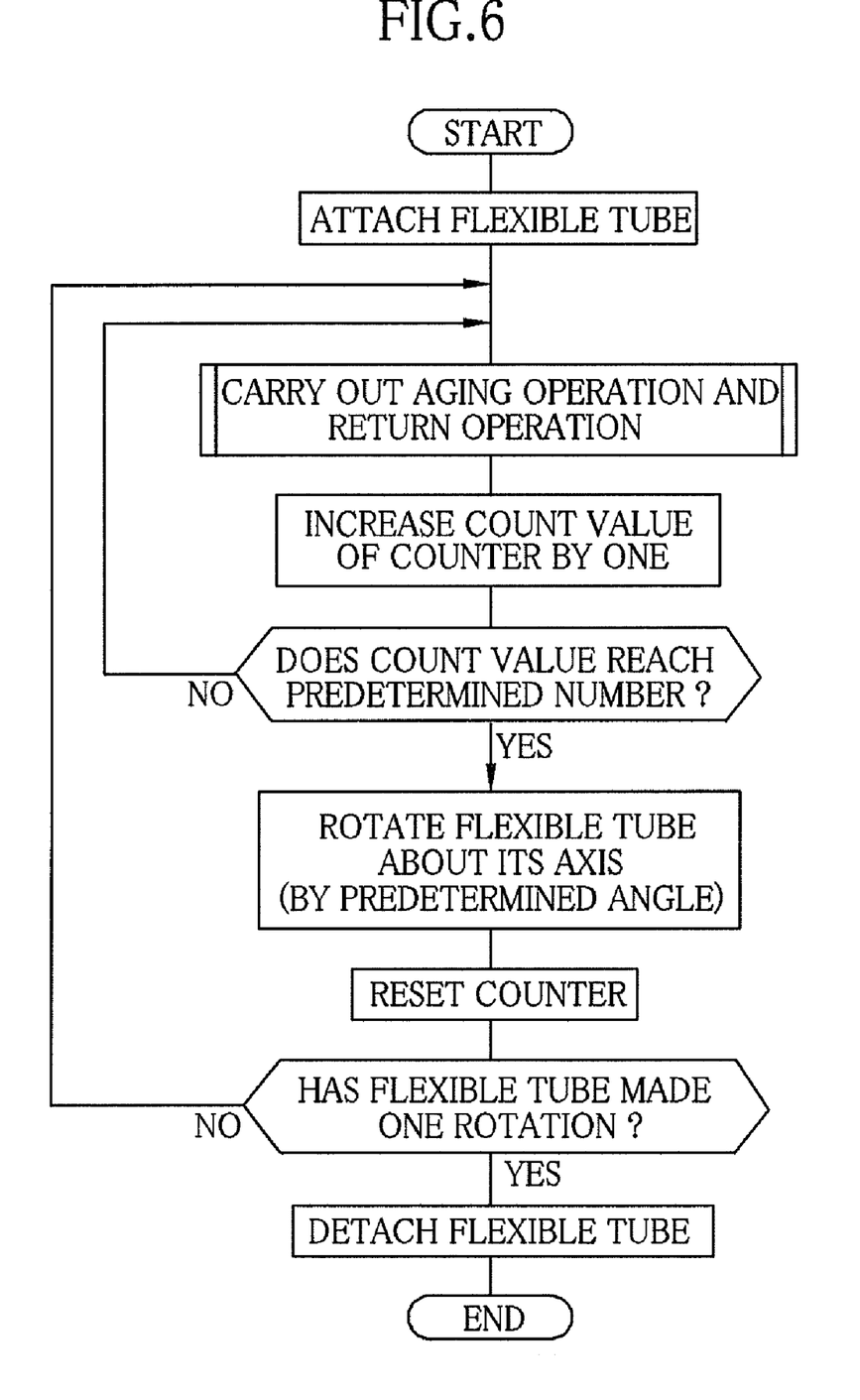
FIG. 6 is a flowchart showing a whole flow of aging processing.
Figure 7:
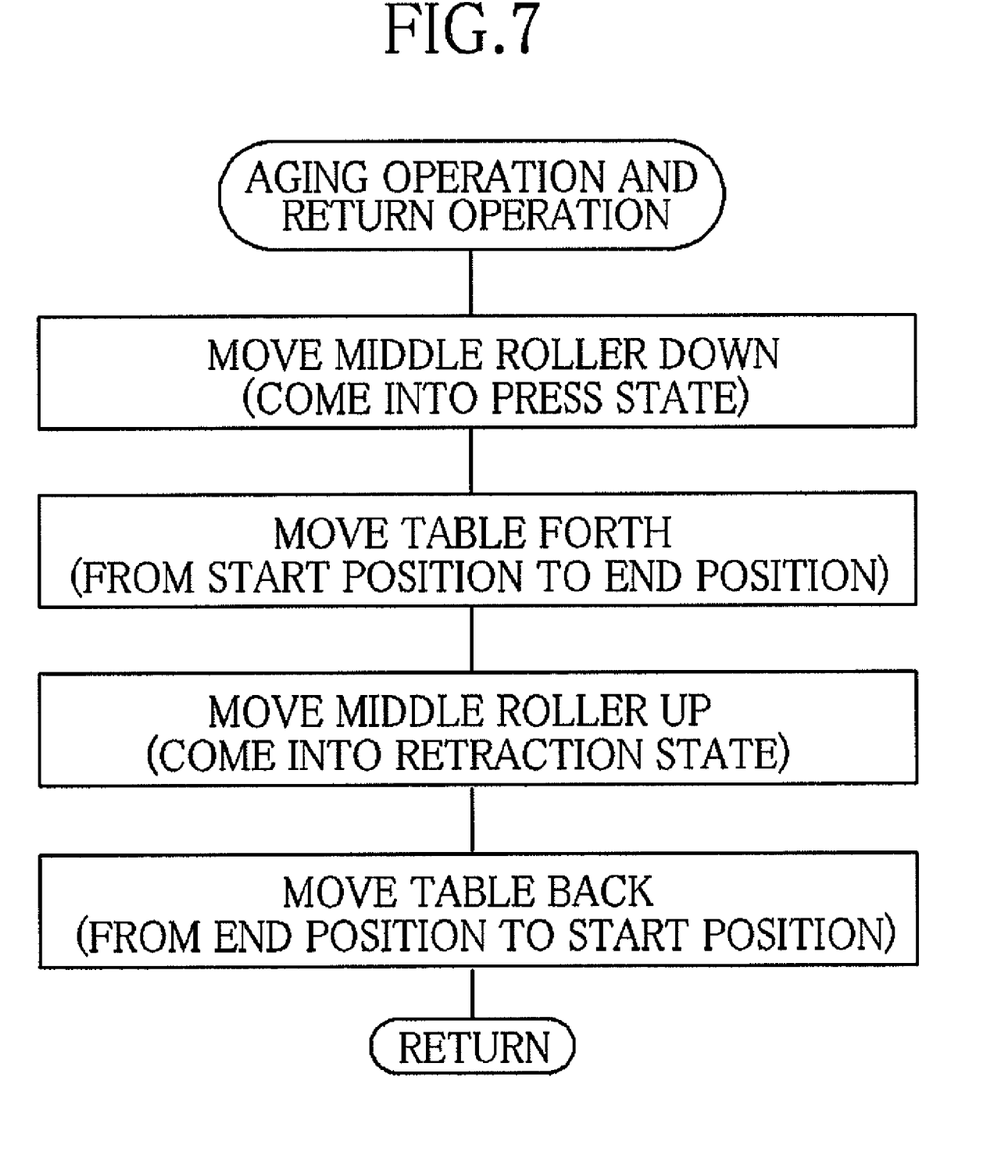
FIG. 7 is a flowchart showing a flow of aging operation and return operation.
Figure 8A:
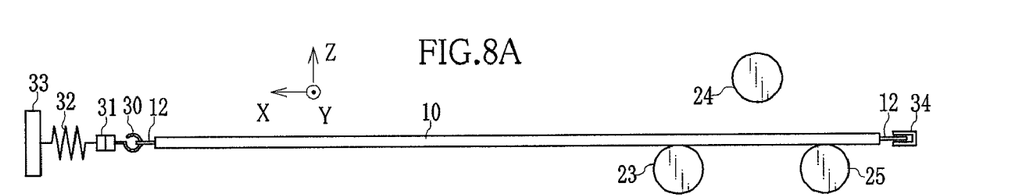
FIGS. 8A to 8D are explanatory views showing the operation of the aging apparatus.
Figure 8B:
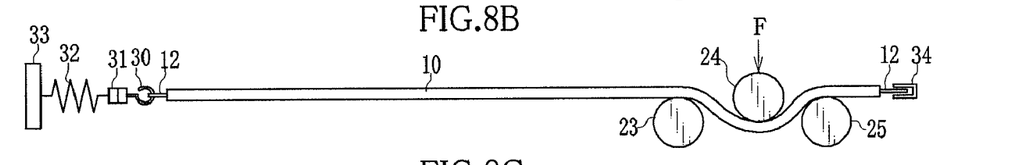
Figure 8C:
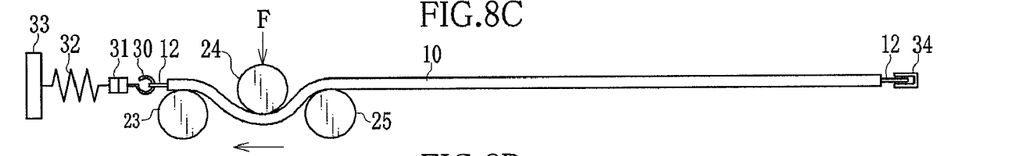
Figure 8D:
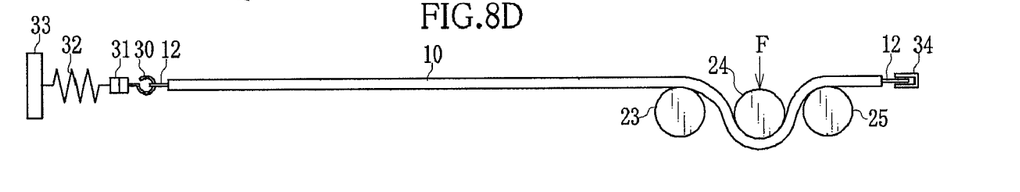

The table 26, as shown in FIG. 5, moves back and forth between the most backward start position (drawn in solid lines) and the most forward end position (drawn in chain double-dashed lines). In the start position, the rear roller 25 makes contact with a rear end of the flexible tube 10. In the end position, the front roller 23 makes contact with a front end of the flexible tube 10.

Along the X direction, the distance L1 between the front roller 23 and the middle roller 24 is larger than the distance L2 between the middle roller 24 and the rear roller 25. This is because the middle roller 24 comes in the press state while the table 26 moves forth and the middle roller 24 comes in the retraction state while the table 26 moves back. When the table 26 moves forth with the middle roller 24 in the press state, the flexible tube 10 is largely bent between the middle roller 24 and the rear roller 25 rather than between the front roller 23 and the middle roller 24. In other words, a bending deformation amount of the flexible tube 10 increases in stages, so that the flexible tube 10 is bent and deformed without undue stress.

The diameter D1 of each roller 23, 24 or 25 is the same as a target bending deformation amount (curvature) of the flexible tube 10. The diameter D1 is set at, for example, 60 mm. In the press state of the middle roller 24, the flexible tube 10 closely fitting to at least a lower half of the periphery of the middle roller 24 means that the flexible tube 10 is bent to the target bending deformation amount (60 mm).

Referring back to FIG. 3, the rotation mechanism 29 has a drive pulley 60, a driven pulley 61, a belt 62 looped over the pulleys 60 and 61, and a pulley drive motor 63 for rotating the drive pulley 60. A rotating shaft 64 extending in the X direction is attached to each chuck 34, and each chuck 34 rotates together with the rotating shaft 64. The driven pulley 61 is fixed to the Y-directional farthest rotating shaft 64. Upon driving the pulley drive motor 63, the farthest rotating shaft 64 and chuck 34 rotate and hence the flexible tube 10 rotates. However, the rotation does not cause damage to the end of the flexible tube 10 by a twist because the twist return member 31 is provided there.

The rotation mechanism 29 further has three gear wheels 65 fixed to the three rotating shafts 64 on a one-by-one basis and two gear wheels 66 provided between the gear wheels 65. The gear wheels 65 and 66 transmit the rotation of the farthest rotating shaft 64 to the nearer two rotating shafts 64. The gear wheels 65 and 66 have the function of rotating the chucks 34 in synchronization with one another so that the three flexible tubes 10, at the maximum, rotate together.

The operation of the pulley drive motor 63 is controlled by a chuck rotation controller 67. Upon inputting a rotation signal from the central controller 49, the chuck rotation controller 67 drives the pulley drive motor 63 so as to rotate the chucks 34 by a predetermined angle (for example, 45°).

The central controller 49 inputs a back signal and a forth signal to the table drive controller 55 so that the table 26 reciprocates between the start position and the end position. The central controller 49 has a counter 68 for counting the reciprocation number of the table 26. The counter 68 is reset when the reciprocation number reaches a predetermined count (for example, 5). The central controller 49 controls the roller shift controller 48 so that the middle rollers 24 come in the press state while the table 26 moves forth and the middle rollers 24 come in the retraction state while the table 26 moves back.

The central controller 49 inputs the rotation signal to the chuck rotation controller 67 so that the flexible tube 10 (chuck 34) rotates by a predetermined angle (for example, 45°) whenever the table 26 reciprocates a predetermined number of times (whenever the counter 68 is reset). It is preferable to set the predetermined angle at a value of dividing 360° into an integer of 2 or more, that is, at 180°, 120°, 90°, 72°, 60° and the like. The central controller 49 has a one rotation judgment section 70 which judges whether or not the flexible tube 10 has made one rotation from a set start angle about its axis. When the one rotation judgment section 70 judges that the flexible tube 10 has made one rotation, the central controller 49 stops inputting the rotation signal.

An operation section 69 is connected to the central controller 49. By operating the operation section 69, a user can start the aging process or change various settings in the aging process in the aging apparatus 20. As the items of settings, there are a press force of the middle rollers 24, the reciprocation number of the table 26 (the reciprocation number of the table 26 until resetting the counter 68), an angle of rotating the flexible tube 10 (chuck 34), a passing speed of the table 26 and the like. The central controller 49, the table drive controller 55, the roller shift controller 48, and a chuck rotation controller 67 compose a control means.

The aging process (aging method) by the aging apparatus 20 will be hereinafter described with referring to FIGS. 6 to 8D. In the aging apparatus 20, the table 26 is in the start position and the middle roller 24 is in the retraction state at the beginning.

First, the three flexible tubes 10 -at the maximum are attached to the aging apparatus 20. After hooking the connector 12 at one end of the flexible tube 10 on the hook 30, the other end of the flexible tube 10 threads over the front roller 23, under the middle roller 24, and over the rear roller 25, and then the chuck 34 catches the connector 12 at the other end of the flexible tube 10. The flexible tube 10 linearly lies in the X direction. The upper ends of the front roller 23 and the rear roller 25 make contact with the flexible tube 10, and the middle roller 24 stays above the flexible tube 10 (refer to FIG. 8A).

By operating the operation section 69, an aging processing start signal is inputted into the central controller 49. The central controller 49 inputs the press signal into the roller shift controller 48. The roller shift controller 48 drives the air cylinder 28 to bring the middle rollers 24 into the press state where the middle rollers 24 press the flexible tubes 10 with the predetermined force. The rear end of the flexible tube 10 is downwardly bent and deformed into a concave shape (refer to FIG. 8B).

The central controller 49 inputs the forth signal into the table drive controller 55. The table drive controller 55 drives the table drive mechanism 27 to move the table 26 from the start position to the end position. A bent portion travels from the rear end of the flexible tube 10 to the front end thereof (refer to FIG. 8C). At this time, since the flexible tube 10 is largely bent between the middle roller 24 and the rear roller 25 rather than between the front roller 23 and the middle roller 24, the bending deformation amount increases in stages and hence the flexible tube 10 is bent and deformed without undue stress.

The central controller 49 inputs the retraction signal to the roller shift controller 48 to bring the middle rollers 24 into the retraction state. Then, the central controller 49 inputs the back signal into the table drive controller 55 to return the table 26 from the end position to the start position. Aging operation refers to operation where the middle rollers 24 come in the press state and the table 26 moves forth to the end position. Return operation refers to operation where the middle rollers 24 come in the retraction state and the table 26 moves back to the start position. Completing one aging operation and one return operation increases a count value of the counter 68 by one.

The central controller 49 reads the count value of the counter 68. When the count value does not reach a predetermined number (for example, five), the central controller 49 outputs signals to carry out the aging operation and the return operation once again. As a result, the aging operation and the return operation are carried out a predetermined number of times. Irrespective of the number of the aging operation, the middle rollers 24 keep pressing the flexible tubes 10 with the predetermined force. Since the flexible tubes 10 get easier to bend with increase in the number of the aging operation, the middle rollers 24 move downwardly, and the bending deformation amount of the flexible tubes 10 increases in accordance with the number of the aging operation. Accordingly, it is possible to perform the aging process on the flexible tube 10 without undue stress. Repeating the aging operation a predetermined number of times, the flexible tube 10 is deformed to the target bending deformation amount (refer to FIG. 8D).

The central controller 49 reads the count value of the counter 68. When the count value reaches the predetermined number, the central controller 49 inputs the rotation signal into the chuck rotation controller 67. In response to it, the rotation mechanism 29 rotates the chuck 34 and the flexible tube 10 by a predetermined angle. Then, the counter 68 is reset.

A predetermined number of the aging operation and the return operation are performed again on the flexible tube 10 in a state of rotating by the predetermined angle from a start angle, at which the flexible tube 10 has been attached at the first. Completing the predetermined number of the aging operation and the return operation, the flexible tubes 10 are further rotated by a predetermined angle in the same direction and the aging operation and the return operation are performed thereon a predetermined number of times. This series of operation is repeated from then on. When the flexible tubes 10 have made one rotation after a while, the one rotation judgment section 70 judges it. Thus, the central controller 49 stops inputting the rotation signal into the chuck rotation controller 67. Then, the all aging process has been completed.

After completing the all aging process, the flexible tubes 10 are detached. Since the aging process has been carried out on the whole length and periphery of the detached flexible tubes 10, the adhesive 16 adhering to the helical tube 13 has been almost removed and the flexible tubes 10 have excellent flexibility.

In the foregoing embodiment, the roller group has three kinds of rollers, that is, the front rollers 23, the middle rollers 24 and the rear rollers 25, but may have four or more kinds of rollers. In this case, the rollers are disposed in such a manner that the adjacent rollers are opposed to each other with sandwiching the flexible tube.

The middle rollers 24 move up and down in the foregoing embodiment, but the middle rollers 24 may be fixed and the front rollers 23 and the rear rollers 25 may shift instead.

In the foregoing embodiment, the press force of the middle rollers 24 is constant irrespective of the number of times of the aging operation, but the press force may be tightened with increase in the number of the aging operation.

The moving speed of the table 26 is constant in the foregoing embodiment irrespective of the number of times of the aging operation. The moving speed, however, may get faster with increase in the number of the aging operation.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An aging apparatus for a flexible tube of an endoscope comprising:
    a flexible tube holding mechanism for holding both ends of said flexible tube and linearly pulling said flexible tube;
    a roller group having at least a front roller, a middle roller, and a rear roller, said rollers being arranged in an axial direction of said flexible tube and axes of said rollers being approximately orthogonal to a longitudinal direction of said flexible tube, said front roller and said rear roller as both side rollers being opposed to said middle roller with sandwiching said flexible tube;
    a table for supporting said roller group;
    a table drive mechanism for moving said table in said axial direction of said flexible tube;
    a roller shift mechanism for pressing one of said middle roller and said both side rollers against said flexible tube so as to bend a part of said flexible tube while said rollers are in parallel with one another; and
    a control means for controlling the operation of said roller shift mechanism and said table drive mechanism to repeat aging operation, which moves said table in a state of pressing said middle roller or said both side rollers against said flexible tube, so that said flexible tube is bent more largely with increase in the number of said aging operation.

2. An aging apparatus as recited in claim 1 further comprising:
    a rotation mechanism for rotating said flexible tube held by said flexible tube holding mechanism about its axis by a predetermined angle whenever said aging operation is repeated a predetermined number of times.

3. An aging apparatus as recited in claim 2, wherein said flexible tube holding mechanism holds one end of said flexible tube via a constant force spring, and said aging operation is carried out in a direction from the other end of said flexible tube to said end with said constant force spring.

4. An aging apparatus as recited in claim 3, wherein the distance between said front roller and said middle roller is larger than that between said middle roller and said rear roller.

5. An aging apparatus as recited in claim 4, wherein said roller shift mechanism presses said middle roller against said flexible tube with a predetermined press force.

6. An aging apparatus as recited in claim 4, wherein said roller shift mechanism presses said middle roller against said flexible tube and a press force is increased with increase in the number of said aging operation.

7. An aging apparatus as recited in claim 4, wherein a moving speed of said table is increased with increase in the number of said aging operation.

* * * * *